United States Patent
Snead (10) Patent No.: US 9,579,694 B2
(45) Date of Patent: Feb. 28, 2017

(54) SYSTEM AND METHOD FOR PROVIDING MACHINE-READABLE FINAL DESTINATION INFORMATION ON MAIL

(71) Applicant: Walter L. Snead, Columbus, OH (US)

(72) Inventor: Walter L. Snead, Columbus, OH (US)

(*) Notice: Subject to any disclaimer, the term of this patent is extended or adjusted under 35 U.S.C. 154(b) by 0 days.

(21) Appl. No.: 14/797,586

(22) Filed: Jul. 13, 2015

(65) Prior Publication Data

US 2016/0228922 A1    Aug. 11, 2016

Related U.S. Application Data (60) Provisional application No. 62/114,365, filed on Feb. 10, 2015.

(51) Int. Cl.
*B07C 7/00* (2006.01)
*G06Q 10/00* (2012.01)
*B07C 3/18* (2006.01)

(52) U.S. Cl.
CPC .............. *B07C 7/005* (2013.01); *B07C 3/18* (2013.01); *G06Q 10/00* (2013.01)

(58) Field of Classification Search
CPC ............ G06Q 30/0601; H04L 63/0281; G06F 17/30575; G06F 17/30879
See application file for complete search history.

(56) References Cited

U.S. PATENT DOCUMENTS

| | | | |
|---|---|---|---|
| 2010/0230328 A1* | 9/2010 | Bonnell | B07C 3/18 209/584 |
| 2014/0279648 A1* | 9/2014 | Whitehouse | G06Q 10/083 705/330 |

FOREIGN PATENT DOCUMENTS

JP        05132093 A  *  5/1993

* cited by examiner

*Primary Examiner* — Sonji Johnson
(74) *Attorney, Agent, or Firm* — Porter, Wright, Morris & Arthur LLP (57) ABSTRACT

A method for providing machine-readable final destination information on mail includes the steps of electronically receiving address information of a final destination for the mail from a sender located at a mail drop box and using an interface device located at the mail drop box. A machine-readable code containing information relating to the final destination of the mail is electronically generated and then printed on a label using a label printer located at the mail drop box. The printed label is presented to the sender at the drop box so that the sender can adhere the printed label to the mail prior to inserting the mail into the drop box. Machine-readable scanners read the machine-readable code on the label to sort the mail for delivery and then mail carriers deliver the mail to the delivery point indicated by the machine-readable code on the label.

20 Claims, 5 Drawing Sheets

SYSTEM AND METHOD FOR PROVIDING MACHINE-READABLE FINAL DESTINATION INFORMATION ON MAIL

CROSS-REFERENCE TO RELATED APPLICATIONS

This application claims the priority benefit of U.S. Provisional Patent Application No. 62/114,365 filed on Feb. 10, 2015, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to systems and methods for mail delivery and, more particularly, to systems and methods for mail delivery including automated reading and sorting of mail.

BACKGROUND OF THE INVENTION

A ZIP (Zone Improvement Plan) code identifies a specific geographic area for postal delivery in the United States. Before ZIP codes were implemented in 1963, two-digit "zones" were used. The U.S. Postal Service first sorted mail by state, then by city, then by zone, then by street address. ZIP codes were implemented by adding three additional digits representing the state and city in front of the two-digit zones. With the five-digit ZIP code, postal employees no longer needed to read the text containing the state and the city in order to sort mail.

In 1983, the "ZIP-plus-four" concept was introduced. The basic five-digit ZIP code remained, but another four-digit number was added to the end of the original five-digit ZIP code. The additional four digit number can represent a specific city block, a specific building, or even one or more specific floors in a large building. The additional four-digit number helps the U.S. Postal Service route mail more efficiently and accurately because it reduces handling and decreases the potential for human error. Thus ZIP-plus-four leads to better control over U.S. Postal Service costs and, in turn, postage rate stability. The ZIP-plus-four was originally intended for use by business mailers who then typically prepared mail with typewritten or machine-printed addresses. As a result, the U.S. Postal Service began requiring bulk mail to have the ZIP-plus-four code. In order to avail the general public of a simple means of obtaining the ZIP-plus-four, the U.S. Postal Service began a ZIP-plus-four look-up system on its Internet website. However, even with this information readily available, the average American citizen still does not typically use the ZIP-plus-four code for non-bulk mailings.

To further reduce handling and decrease the potential for human error, the U.S. Postal Service also moved toward automated reading and sorting. Addresses on mail are scanned and Optical Character Recognition (OCR) equipment converts images of the typewritten or printed text of the addresses into machine-encoded text which is used by automated equipment to sort the mail. However, OCR equipment is not perfect in reading human-readable text, particularly hand written text which is messy or strays too far from standard form. This can lead to the equipment reading an incorrect address and misdirecting of the mail and/or the need for human intervention to manually read and place a machine-readable code onto the mail so that it can be properly sorted and delivered.

To decrease the potential for OCR error, mail can be provided with machine-readable code or codes such as, for example, barcodes which contain ZIP code and/or final destination information. The machine-readable codes are read by automated equipment with a lower error rate than human-readable text. The U.S. Postal Service has adopted the Intelligent Mail Barcode (IM barcode) which is a 65-bar code for use on mail in the United States. The IM barcode contains the ZIP-plus-four code, an additional two digits used to indicate the exact final destination or delivery point (DP), as well as tracking and other information. Note that every single DP in the U.S. should have its own unique 11-digit number. These two additional digits are usually the last two digits of the street address or box number, though non-numeric points with names or letters are assigned DP numbers by the local U.S. post office. The IM barcode enables the U.S. Postal Service to provide improved deliverability and tracking of domestic mail and improves overall efficiency.

Barcodes representing the DP are often manually affixed to mail by postal workers when the automated equipment fails to read the text of the address and the IM barcodes were not provided by the sender in addition to the human-readable text of the address. Senders of bulk mail in the U.S. receive a discount on postage if they provide a preprinted IM barcode on the bulk mail. However, no such discount is provided to senders of non-bulk mail. Additionally, the average American does not have the equipment and/or information to include a preprinted IM barcode on their non-bulk mail and even when they do, it can be inconvenient. As a result, most non-bulk mail in the U.S. does not include an IM barcode or any other kind of machine-readable code provided by the sender and the U.S. Postal Service cannot obtain the full benefit of its automated systems when the OCR equipment fails.

Accordingly, there is a need for an improved system and method for providing machine-readable destination information on mail, particularly non-bulk mail sent by the general public.

SUMMARY OF THE INVENTION

Disclosed are systems and methods for providing machine-readable destination information on mail which address one or more issues of the related art. Disclosed is method for providing machine-readable destination information on mail comprising the steps of, in combination, electronically receiving address information of a final destination for the mail from a sender of the mail located at a mail drop box and using a user interface device located at the mail drop box and associated with the mail drop box, electronically generating a machine-readable code containing destination information relating to the final destination of the mail, printing at least the machine-readable code on at least one of a label and an envelope using a printer located at the mail drop box, and providing the at least one of the printed label and the printed envelope to the sender at the mail drop box so that the sender can incorporate the at least one of the printed label and the printed envelope with the mail prior to inserting the mail into the mail drop box.

Also disclosed is a system for providing machine-readable destination information on mail comprising, in combination, a mail drop box, and a coding device at the mail drop box having a controller including memory and a processor, at least one user interface device operably connected to the controller, and printer operably connected to the controller to receive electronic instructions from the controller. The memory comprises computer-executable instructions executable by the processor to perform the following steps: electronically receiving address information of a final destination for the mail from a sender of the mail located at a mail drop box and using a user interface device located at the mail drop box and associated with the mail drop box; electronically generating a machine-readable code containing destination information relating to the final destination of the mail; printing at least the machine-readable code on at least one of a label and an envelope using a printer located at the mail drop box; and providing the at least one of the printed label and the printed envelope to the sender at the mail drop box so that the sender can incorporate the at least one of the printed label and the printed envelope with the mail the mail prior to inserting the mail into the mail drop box.

Also disclosed is a method for providing machine-readable destination information on mail comprising the steps of, in combination, electronically receiving address information of a final destination for the mail from a sender of the mail located at a mail drop box and using a user interface device located at the mail drop box and associated with the mail drop box, electronically obtaining a nine-digit ZIP code for the final destination for the mail based on the address information received from the sender, electronically generating a machine-readable code containing destination information relating to the final destination of the mail, printing at least the machine-readable code on a label using a label printer located at the mail drop box and attached to the mail drop box, and providing the printed label to the sender at the mail drop box so that the sender can incorporate the at least one of the printed label and the printed envelope with the mail prior to inserting the mail into the mail drop box. The machine-readable code contains destination information relating to the nine-digit ZIP code for the final destination of the mail.

From the foregoing disclosure and the following more detailed description of various preferred embodiments it will be apparent to those skilled in the art that the present invention provides a significant advance in the technology and art of systems and methods for providing machine-readable final destination information on mail. Particularly significant in this regard is the potential the invention affords for providing and easy to use system and method for providing mail with machine-readable codes for automated reading, sorting, tracking etc. Additional features and advantages of various preferred embodiments will be better understood in view of the detailed description provided below.

BRIEF DESCRIPTION OF THE DRAWINGS

These and further features of the present invention will be apparent with reference to the following description and drawings.

It should be understood that the appended drawings are not necessarily to scale, presenting a somewhat simplified representation of various preferred features illustrative of the basic principles of the invention. The specific design features of the systems as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the systems illustrated in the drawings.

DETAILED DESCRIPTION OF CERTAIN EMBODIMENTS

It will be apparent to those skilled in the art, that is, to those who have knowledge or experience in this area of technology, that many uses and design variations are possible for the systems and methods providing machine-readable final destination information on mail disclosed herein. The following detailed discussion of various alternative and preferred embodiments will illustrate the general principles of the invention with regard to a particular embodiment. Other embodiments suitable for other applications will be apparent to those skilled in the art given the benefit of this disclosure.

Figure 1:
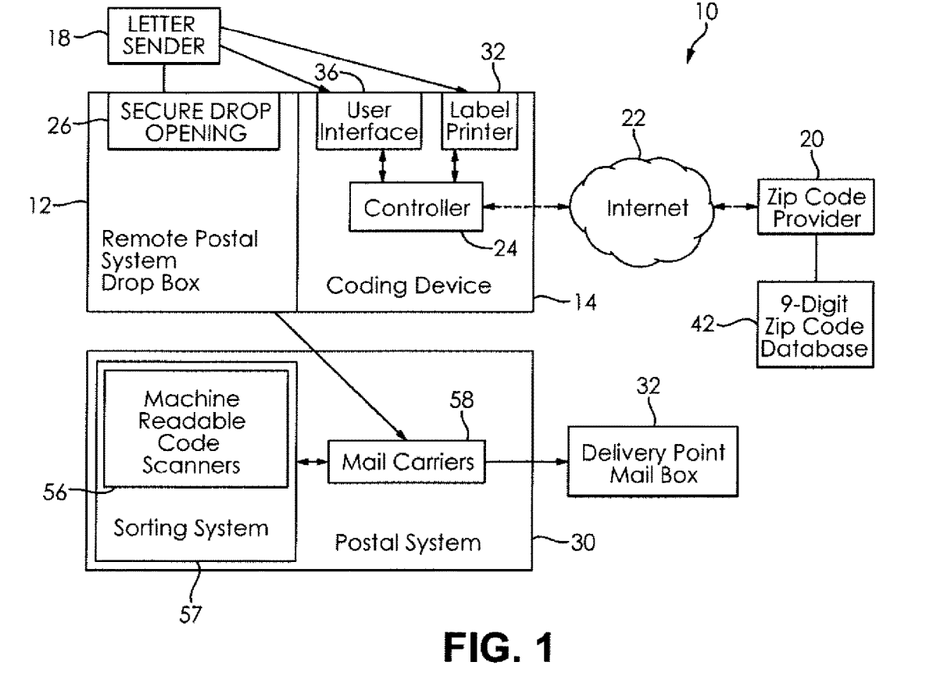
FIG. 1 is schematic view of a web-based system according to the present invention.

Referring now to the drawings, FIG. 1 illustrates a system 10 for providing machine-readable final destination information on mail according to the present invention. The illustrated system includes a postal system drop box or mail drop box 12 at a remote location, a coding device 14 located at the mail drop box 12 and associated with the mail drop box 12 for providing machine-readable destination information and/or machine-readable final destination information 16 (best seen in FIGS. 4 to 6) to a mail sender 18 located at the mail drop box 12, and at least one service or ZIP code provider server or computer 20 located remote from the mail drop box 12 in communication via an electronic communication system 22 with a computer or controller 24 of the coding device 14 for providing 9-digit ZIP code information to the coding device 14. The term "mail" is used in the specification and claims to mean materials, such as letters, packages, and the like, handled in a postal system. The terms "postal system" and "mail system" are used in the specification and claims to mean a government-run or private-run system by which mail is transported and delivered to individual, organizations, and the like such as, for example, the USPS, FedEx, UPS, DSL, etc. The terms "drop box" and "postal box" are used in the specification and claims to mean a secured receptacle provided by a postal system into which mail can be deposited by a sender. The terms "remote" and "remote location" are used in the specification and claims to mean a location away from a postal system office or other location where in-person and/or automated postal system services are provided such as, for example, selling postage, and the like. The term "destination information" is used in the specification and claims to mean information that identifies a general delivery location so that the street, city block, and/or building floor is identifiable such as, for example, the ZIP-plus-four or nine-digit ZIP code for a destination. The terms "final destination information" and "delivery point information" are used in the specification and claims to mean information that identifies an exact final delivery location so that the street address or box number is identifiable such as, for example, the Intelligent Mail Barcode (IM barcode) for a destination. The term "server" is used in the specification and claims to mean a computer configured to manage, store, send and process data via a computer network essentially 24-hours a day and seven days a week. It is noted that only one mail drop box 12 is shown in FIG. 1, but it is noted that the system 10 typically would have a large plurality of the mail drop boxes 12 at a variety of remote locations.

The illustrated service or ZIP code provider server 20 and the illustrated controller 24 of the coding device 14 are in electronic communication with one another via the communication system 22. The illustrated communication system 22 is a computer network such as the Internet, but any other suitable communication system can alternatively be utilized such as, for example, an intranet, any other type network of computers, and the like. The electronic communication can be at least partly provided by a wireless communication network such as, for example, a cell phone network.

Figure 2:
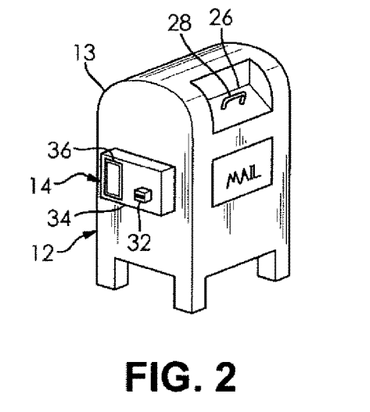
FIG. 2 is perspective view of an exemplary remote mail drop box of the system of FIG. 1.

As shown in FIG. 2, the mail drop box 12 of the system of FIG. 1 can be a free standing mail drop box configured to receive mail from the sender 18 through a secure drop-box opening 26. The illustrated secure drop-box opening 26 is opened by the sender 18 by pulling a drum handle 28 in outward direction in a known manner so that the mail can be inserted into the secure drop box opening 26 by the sender 18. Once the mail is inserted into the mail drop box 12 through the secure drop-box opening 26 by the sender, the mail is securely retained within the mail drop box 12 until removed by an authorized postal worker and forwarded into the postal system 30 (best seen in FIG.1) for sorting and delivery to the mail box 32 (best seen in FIG. 1) of the mail recipient at the final destination. It is noted that the mail drop box 12 can alternatively be any other suitable kind of mail drop box such as, for example, an in-wall mail drop box, a mail drop box configured to receive letters and packages, and the like. It is noted that while the illustrated system 10 and mail drop box 12 are configured for the U.S. Postal System, the system 10 and mail drop box 12 can alternatively be for any other suitable postal system 30.

Figure 3:
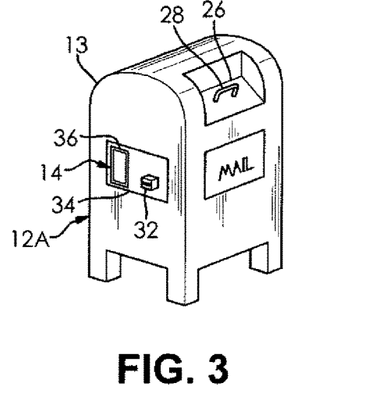
FIG. 3 is schematic view of a second embodiment of the remote mail drop box similar to the mail drop box of FIG. 2 but wherein the coding device is integrated into the mail drop box rather than secured to an exterior of the mail drop box.

The mail drop box 12 of FIG. 2 illustrates that the coding device 14 can be securely attached on an outer housing 13 of the mail drop box 12 and accessed by a mail sender 18 at an exterior of the mail drop box 12. Attaching a coding box 14 to the exterior of the mail drop box 12 permits existing drop boxes to be easily retrofitted for use in the system 10 according to the present invention. FIG. 3 shows an alternative mail drop box 12A wherein the coding device 14 is integrated into the interior of the outer housing 13 of the mail drop box 12A yet is accessible to mail senders 18 on the exterior of the mail drop box 12A through an opening or the like in the outer housing 13 to provide access for the sender 18 to the coding device 14. Integrating the coding device 14 into the interior of the mail drop box 12A in this manner may be preferable so that it is more difficult for unauthorized persons to remove the coding device 14 from the mail drop box 12A and/or there is less impact on the outward size and shape of the mail drop box 12A.

The illustrated coding device 14 includes a housing 34, the controller 24 located within the housing 24 and in electronic communication with the service or ZIP code provider server 20, at least one user interface or input/output device 36 in communication with the controller 24 for receiving information from the mail sender 18, and a label and/or envelope printer 38 for printing the machine-readable final destination information 16 specific to the user's mail for use by the mail sender 18.

The illustrated controller 24 includes memory, at least one processor or central processing units (CPU) in communication with the memory, and at least one network interface in communication with the processor, all of which is configured to carry out the functions and steps of the present invention described herein. The illustrated memory stores data files, system software (OS) and the like. Alternatively embedded software or the like can be utilized. It is noted that any other suitable information and/or software can be stored in the processor and/or memory. The at least one processor can be of any suitable type. The network interface can be of any suitable type such as, for example, a network interface card, software simulating a network card, and the like. The illustrated processor and memory are programmed with software for communicating with the web portal of the service or ZIP code provider server as described herein.

The illustrated at least one input/output (IO) interface or user interface device 36 is in communication with the processor of the controller 24 so that the user or sender can input information to the controller 24 and receive information from the controller. The illustrated user interface device 36 is a touch screen display with which information can be displayed to the user from the controller 24 and the user can touch to input information to the controller 24. It is noted that any other suitable user interface device or combination of user interface devices can alternatively be utilized such as, for example, a keypad, a key board, a mouse, a track ball, a touch pad, non-touch display, a camera, a speaker, and/or the like.

Figure 4:
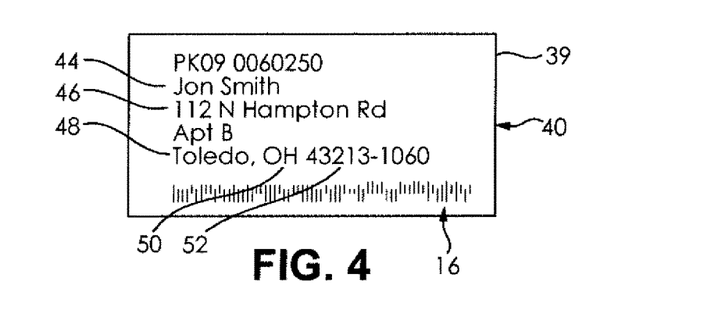
FIG. 4 is a front view of an exemplary mailing label with a machine-readable code (for use with the U.S. Postal System) provided by the system of FIG. 1.
Figure 5:
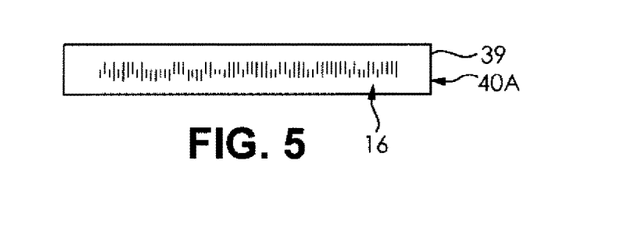
FIG. 5 is front view of another exemplary mailing label with machine-readable code (for use with the U.S. Postal System) provided by the system of FIG. 1.

The illustrated printer 38 is a computer label printer that prints on self-adhesive label material, card-stock, and/or the like 39 to form a printed label 40 (best seen in FIGS. 4 and 5). The label printer 38 preferably includes a feed mechanism to handle rolled stock, or tear sheet (fanfold) stock. The label printer 38 is preferably a thermal printer but alternatively can be of any other suitable type such as, for example, laser, impact, or the like. The label printer 38 preferably can use a wide range of label materials, including but not limited to, paper and synthetic polymer ("plastic") materials. It is noted that the label printer 38 can alternatively or additionally configured to receive labels 39 from the senders 18 for printing. It is also noted that the printer 38 can alternatively be a label and envelope printer, an envelope printer, or any other suitable type of printer. The label printer 38 can be configured to print on labels 39 provided by the postal system, labels 39 inserted by the sender 18, or both. The printer 38 can also be configured to print on envelopes 53 instead of or in addition to the labels 39. When the printer 38 prints on envelopes 53, the printer 38 can be configured to print on envelopes 53 provided by the postal system, envelopes 53 inserted by the sender 18, or both.

The illustrated service or ZIP code provider server or computer 20 includes memory, at least one processor or central processing units (CPU) in communication with the memory, one or more input/output (IO) interfaces in communication with the processor, and at least one network interface in communication with the processor, all of which is configured to carry out the functions and steps described herein. The illustrated memory stores data files, an operating system (OS), host applications for communications with web browsers and/or mobile applications, security applications for limiting access to authorized users, and a database management system for interfacing with databases having stored information. It is noted that any other suitable information and/or software can be stored in the processor and/or the memory. An illustrated ZIP code database 42 is separate from the service provider server or computer 20 but it is noted that the ZIP code database 42 can alternatively be integrated with the service provider server or computer 20. The illustrated ZIP code database 42 is located at the service provider and/or a cloud location but it is noted that the ZIP code database 42 can alternatively be located at any other suitable location and/or be of any other suitable type. The illustrated ZIP code database 42 stores information relating to nine digit ZIP codes for all, or substantially all, mail delivery addresses in the United States. The at least one processor can be of any suitable type. The at least one IO interface can be of any suitable type such as a keyboard, a mouse, a track ball, a touch pad, a camera, a speaker, a monitor, a printer, a modem, a disk drive and the like. The network interface can be of any suitable type such as, for example, a network interface card, software simulating a network card, and the like. Alternatively, the nine-digit ZIP codes can be stored in the memory of the controller 24 and/or a separate database within the coding device 14. In this alternative embodiment, the connection with the communication system 22 can be used to update the nine-digit ZIP code information in memory and/or the nine-digit ZIP code information can be updated by field technicians visiting the drop box 12 with the connection with the communication system 22 eliminated if desired.

FIG. 4 shows an exemplary printed label 40 printed by the printer 38 for attachment to the sender's mail. The illustrated printed label 40 is configured for use with the U.S. Postal Service but can alternatively be configured for use with any other postal system 30. The illustrated printed label 40 includes (1) the mail recipient's name 44, street address 46, city 48, state 50, and nine digit ZIP code 52 (that is, the ZIP-plus-four) in human-readable text form, and (2) the machine-readable code 16 in the form of a barcode including destination information including at least the nine digit ZIP code 52 (that is, the ZIP-plus-four) of the destination of the mail but more specifically including final destination information including a unique 11-digit number for the delivery point for the mail. The illustrated machine-readable code 16 is a barcode and, more specifically, is an IM barcode including information representing the unique 11-digit number for the DP as currently preferred by the U.S. Postal Service. It is noted that machine-readable code 16 can include any other desirable destination information or final destination information and/or can be of any other suitable type such as, for example, Code 11, Codabar, Plessey, MSI, 2 of 5, UCC/EAN-128, SSCC-18, Code 39, Code 128, Code 93, GS1 Databar (RSS-214), GS1 Databar expanded, PDF 417, Data Matrix, MaxiCode, QR Code, and the like that is to be used by the applicable postal system 30. It is noted that different governmental postal services and different private mail carriers utilize different types of machine-readable codes 16. It is also noted that the printed label 40 can alternatively be provided with more than one type of machine-readable code 16. For example, international mail can include machine-readable codes 16 for mail carriers both the originating and destination countries. The label material can be of any suitable type for printing by the printer 38 and attachment to a mail envelope or package such as, for example, a paper and/or polymer web with a pressure-sensitive adhesive on one side.

The IM barcode is a 65-bar code for use on mail in the United States. The term "Intelligent Mail" refers to services offered by the U.S. Postal Service for domestic mail delivery. The IM barcode is intended to provide greater information and functionality than its predecessors POSTNET and PLANET. An IM barcode has also been referred to as a One Code Solution and a 4-State Customer Barcode, abbreviated 4CB, 4-CB or USPS4CB. The complete specification can be found in U.S. Postal Service Document USPS-B-3200E, the disclosure of which is expressly incorporated herein by reference. The IM barcode effectively incorporates both routing ZIP code and tracking information included in previously used postal barcode standards. The IM barcode is a height-modulated barcode that encodes up to 31 decimal digits of mail-piece data into 65 vertical bars. The code is made up of four distinct symbols, which is why it was once referred to as the 4-State Customer Barcode. Each bar contains the central "tracker" portion, and may contain an ascender, descender, neither, or both (a "full bar"). The 65 bars represent 130 bits (or 39.13 decimal digits), grouped as ten 13-bit characters. Each character has 2, 5, 8, or 11 of its 13 bits set to one. The Hamming distance between characters is at least 2. Consequently, single-bit errors in a character can be detected (adding or deleting one bit results in an invalid character). The characters are interleaved throughout the symbol. The number of characters can be calculated from the binomial coefficient. The total number of characters is two times 1365, or 2730. $\log_2 (2730)$ is 11.41469. So the 65 bars (or 130 bits) encode a 114-bit message. The encoding includes an eleven-bit cyclic redundancy check (CRC). Subtracting the 11 CRC bits from the 114-bit message leaves an information payload of 103 bits (the specification sets one of those bits to zero). Consequently, 27 of the 130 bits are devoted to error detection. The encoding scheme does not use error correction. The IM barcode carries a data payload of 31 digits representing the following elements: barcode identifier; service type identifier: mailer ID: sequence number: and delivery point ZIP code.

FIG. 5 shows an exemplary alternative printed label 40A printed by the printer 38 for attachment to the sender's mail. The illustrated alternative printed label 40A is configured for use with the U.S. Postal Service but can alternatively be configured for use with any other governmental or private mail carrier. The illustrated alternative printed label 40A includes only the machine-readable code 16 including destination information including at least the nine digit ZIP code (that is, the ZIP-plus-four) for the destination of the mail and more specifically final destination information including the unique 11-digit number for the destination point of the mail. It is noted that the above described printed label which includes the human-readable address information is preferred because even though the mail even if the mail is properly sorted by the automated equipment using the machine-readable code 16 including the destination information, the mail carrier may have difficulty completing delivery of the human-readable address information is illegible which is often the case when hand written. The illustrated machine-readable code is a barcode and, more specifically, an IM barcode including information representing the unique 11-digit number for the delivery point of the mail as currently preferred by the U.S. Postal Service. It is noted that machine-readable code can include any other suitable information and/or can be of any other suitable type that is to be used by the applicable postal system 30. It is noted that different governmental postal services and different private mail carriers utilize different types of machine-readable codes. It is also noted that the alternative printed label can alternatively be provided with more than one type of machine-readable code 16. For example, international mail can include machine-readable codes for both the originating and destination countries. The alternative printed label 40A can be of any suitable type for printing by the printer 38 and attachment to the mail envelope or package such as, for example, a paper and/or polymer web with pressure-sensitive adhesive on one side.

It is noted that the coding device 14 can be configured to provide a quantity of one, two, or more of the printed labels 40, 40A for attachment to the mail. If one printed label 40, 40A is provided to the sender 18, the printed label 40, 40A is adhered to the front of the envelope or package (that is the side with the text of the recipient address) by the sender 18 prior to the sender 18 inserting the mail to the mail drop box 12, 12A. If two of the printed labels 40, 40A are provided to the sender 18, the printed labels 40, 40A can be attached by the sender 18 to both the front and rear of the mail. The coding device 14 can alternatively be configured to provide the sender with the option of receiving any desired quantity if the printed labels 40, 40A.

Figure 6:
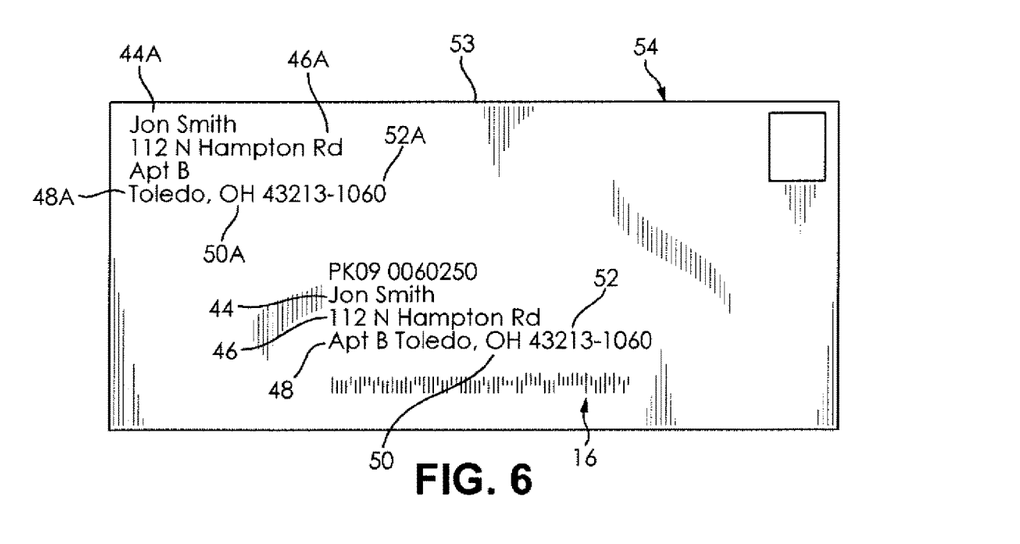
FIG. 6 is a front view of an exemplary mailing envelope with machine-readable code (for use with the U.S. Postal System) provided by the system of FIG. 1.

FIG. 6 shows an exemplary printed envelope 54 printed by the label/envelope printer 38. The illustrated printed envelope 54 is configured for use with the U.S. Postal Service but can alternatively be configured for use with any other governmental or private mail carrier. The illustrated printed envelope 54 includes (1) the mail sender's name 44A, street address 46A, city 48A, state 50A, and nine digit ZIP code 52A in human-readable text form at the upper left corner of the front of the envelope 54, (2) the mail recipient's name 44, street address 46, city 48, state 50, and nine digit ZIP code 52 (that is, the ZIP-plus-four) in human-readable text form at the lower central portion of the front of the envelope 54, and (3) a machine-readable code 16 including destination information including at least the nine digit ZIP code 52 (that is, the ZIP-plus-four) for the destination of the mail but more specifically including final destination information including the unique 11-digit number for the destination point of the mail at the lower central portion of the front of the envelope 54. The illustrated machine-readable code 16 is a barcode and, more specifically, an IM barcode including final destination information including the unique 11-digit number for the destination point of the mail as currently preferred by the U.S. Postal Service. It is noted that machine-readable code can have any other suitable information and/or be of any other suitable type that is to be used by the applicable postal system 30. It is noted that different governmental postal services and different private mail carriers utilize different types of machine-readable codes. It is also noted that the printed envelope 54 can alternatively be provided with more than one type of machine-readable code 16. For example, an envelope for international mail can include machine-readable codes for both the originating and destination countries. The printed envelope 54 can be of any suitable type and size for printing by the printer 38 such as, for example, a paper commercial flap #10 envelopes or the like.

Figure 7:
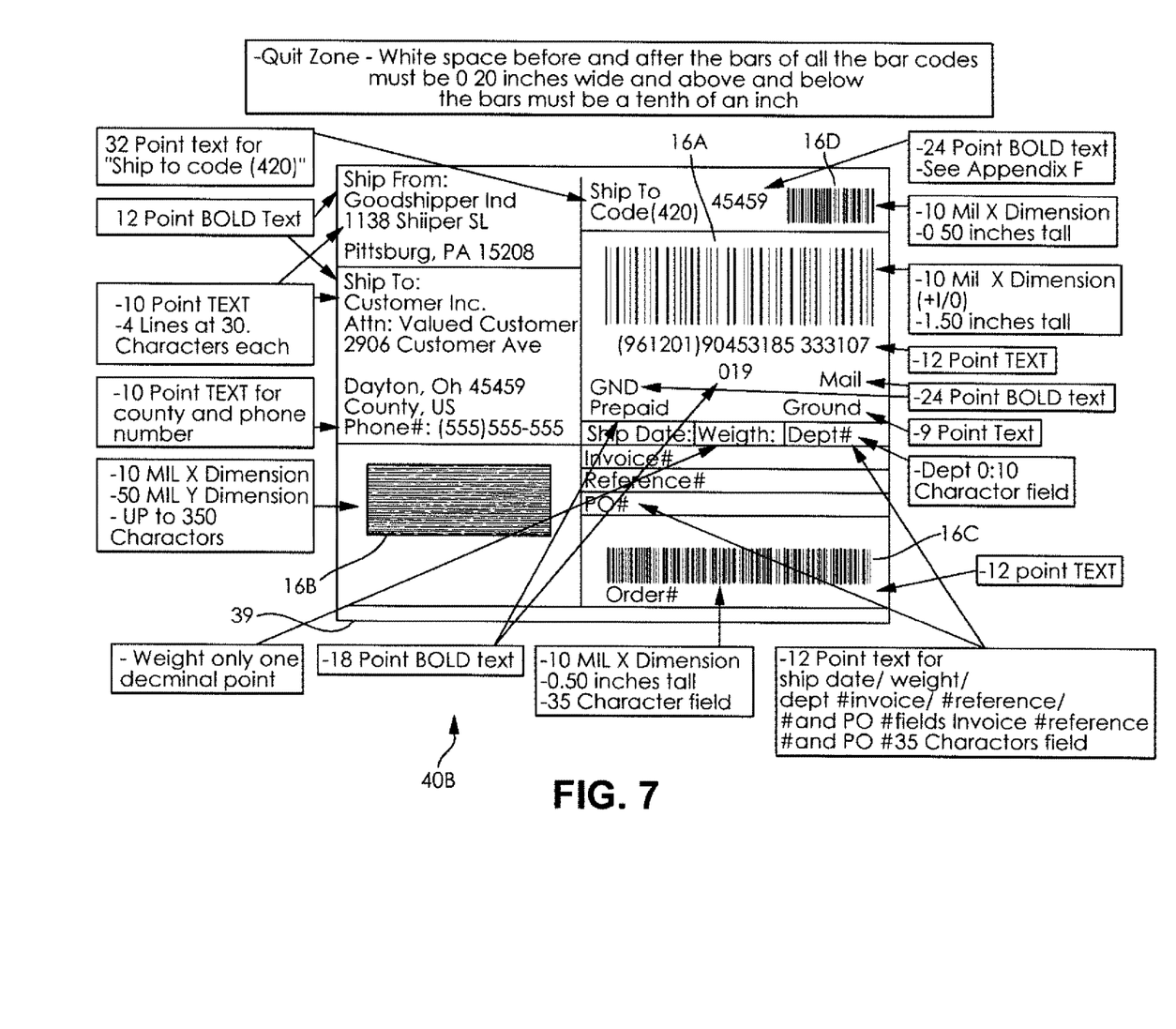
FIG. 7 is front view of an exemplary mailing label with machine-readable code (for use with FedEx Ground Package System, Inc.) provided by the system of FIG. 1.

FIG. 7 shows another alternative exemplary printed label 40B printed by the printer 38 for attachment by the sender 18 to the mail. The illustrated printed label 40B is configured for use with FedEx Ground but can alternatively be configured for use with any other governmental or private mail carrier. The illustrated printed label 40B includes: (1) the mail sender's name, street address, city, state, and postal code in human-readable text form; (2) the mail recipient's name, street address, city, state, postal code, country, and phone number in human-readable text form, (3) a first or primary machine-readable code 16A in the form of a bar code including information representing at least a unique package number; (4) a second machine-readable code 16B including information representing at least the recipient's postal code; (3) a third machine-readable code 16C in the form of a bar code including information representing at least a unique package number; (4) a fourth machine-readable code 16D in the form of a bar code including information representing the destination postal code. The label 39 can be of any suitable type for printing by the printer 38 and attachment to the mail such as, for example, a paper and/or polymer web with a pressure-sensitive adhesive on one side. This printed label 40B illustrates that different postal systems 30 can utilize different types of machine-readable codes 16 and that machine-readable codes 16 of types different than IM barcodes can be utilized by the systems and methods of the present invention. This printed label 40B also illustrates that the printed label 40B can be provided with more than one type of machine-readable code 16A, 16B, 16C, 16D.

The illustrated first machine-readable code 16A is a barcode and more particularly a Code 128 type barcode using subset C as currently preferred by the FedEx Ground. It is commonly referred to as the "96" bar code because it always begins with a "96". Code 128 is a variable length, high density alphanumeric symbology. The illustrated barcode is more particularly a UCC/EAN-128 barcode which is a variation of the original Code 128 and was designed primarily for use in product identification applications. The UCC/EAN-128 uses the same code set as Code 128 except that it does not support FNC2-FNC4. The data content for the primary machine-readable code is (1) start character (character 1); (2) FNC1 (character 2); (3) Application identifier (characters 3-4); (4) Serial Container Numeric Code (SCNC) (characters 5-6; (5) Class of Service (characters 7-9); (6) FedEx Ground Shipper ID (characters 10-16); (7) Package Number (characters 17-23); (8) Check Digit (character 24); Check Digit (character 25; and (9) Stop Character (character 26). Thus there are a total of 26 characters of which 22 are user defined characters. See FedEx Ground Bar Code & Label Layout Specification for more details, the entire content of which are expressly incorporated herein by reference.

The illustrated second machine-readable code 16B is a barcode and more particularly a PDF-417 type barcode. A PDF-417 is a high density two dimensional alphanumeric bar code symbology that essentially consists of a series of stacked linear bar codes. The data content of the barcode can include: mandatory transportation data; optional transportation data; and trading partner data as described in ANSI MH10.8.3. FEDEX Ground uses the following structure: (message header; (2) Format Envelope Header: (3) Recipient Postal Code; (4) Recipient Country Code; (5) Class of Service; (7) Tracking Number; (8) Origin Carrier SCAC; (9) Pickup Location; (10) Julian Pickup Date; (11) Shipment ID Number; (12) Container n of total x; (13) Weight in pounds; (14) Cross Match Postal Code to State; (15) Recipient Street Address; (16) Recipient City; (17) Recipient State/province; (18) Format Separator; and (19) Message Trailer. See FedEx Ground Bar Code & Label Layout Specification for more details, the entire content of which are expressly incorporated herein by reference.

The illustrated third machine-readable code 16C is a barcode and more particularly a SSCC-18 type barcode. The SSCC-18 barcode is an industry standard linear barcode for container marking in commercial, industrial, and retail sectors as determined by the Uniform Commercial Code (UCC). The SCC-18 code can be used to identify a container by both the shipper and the recipient. FedEx ground uses the SSCC-18 barcode as the package tracking identification number (while the first and second barcodes are used to provide the transportation information not included in the third barcode). The data content of the SSCC-18 barcode is an a 18 digit number including: (1) Package Type (position 18); (2) unique package number (positions 11-17); (3) reserved (positions 2-10); and (4) check character (position 1).

The illustrated fourth machine-readable code 16D is a barcode and more particularly a barcoded destination ZIP code in order to speed up the Scan, Weigh and Key (SWAK) process and reduce data entry errors. This barcode is a linear barcode that includes nothing but the destination ZIP code and can be in any one of three formats for FedEx Ground: FIVE DIGIT; VICS; or FACT.

Figure 8:
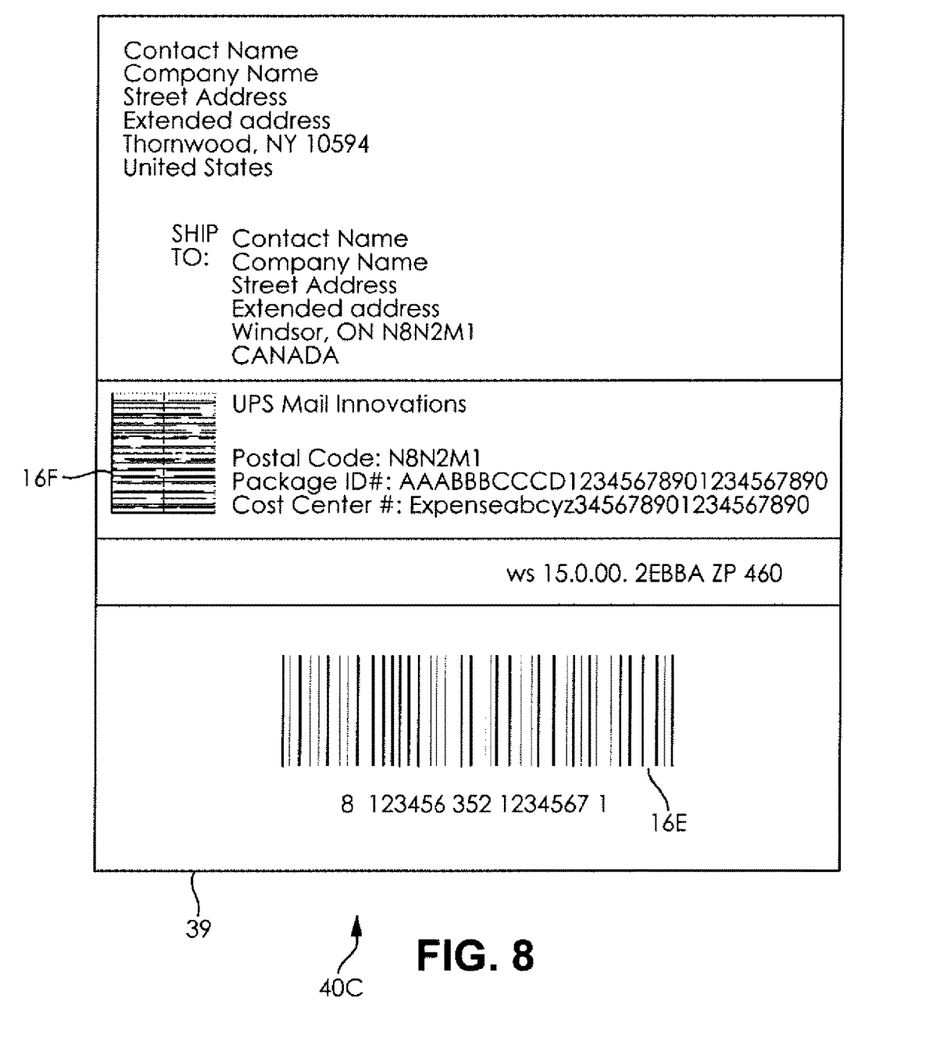
FIG. 8 is front view of an exemplary mailing label with machine-readable code (for use with United Parcel Service of America, Inc.) provided by the system of FIG. 1.

FIG. 8 shows another alternative exemplary printed label 40C printed by the printer 38 for attachment by the sender 18 to the mail. The illustrated printed label 40C is configured for use with United Parcel Service of America, Inc. or "UPS" but can alternatively be configured for use with any other governmental or private mail carrier. The illustrated printed label 40C includes: (1) the mail sender's name, street address, city, state, postal code, and country and in human-readable text form; (2) the mail recipient's name, street address, city, state, postal code, and country, in human-readable text form, (3) a first or primary machine-readable code 16E in the form of a bar code including information representing at least a tracking number; and (4) a second machine-readable code 16F including information representing at least the recipient's postal code. The label materials can be of any suitable type for printing by the printer 38 and attachment to the mail envelope such as, for example, a paper and/or polymer web with a pressure-sensitive adhesive on one side. This printed label 40C illustrates that different governmental postal services and private mail carriers utilize different types of machine-readable codes and that machine-readable codes of types different than IM barcodes can be utilized by the system and method of the present invention. This printed label 40C also illustrates that the printed label can be provided with more than one type of machine-readable code 16E, 16F.

The illustrated first machine-readable code 16E is a linear barcode and more particularly a USPS IMpb Tracking Number type barcode. The content includes: (1) Shipping Application ID (1 digit); (2) Mail Innovations Account Number (6 digits); (3) Julian day of Pickup (3 digits); (4) Unique Sequence Number (7 digits); and (5) Check Digit (1 digit). See the USPS Barcode Package Intelligent Mail Specification for more detail, the content of which is expressly incorporated herein by reference.

The illustrated second machine-readable code 16F is a barcode and more particularly a Data Matrix barcode. The Data Matrix barcode is a 2D barcode used for worldwide addressing and package sortation. The content includes: (1) Message version Number; (2) Mail Manifest ID; (3) Customer ID; (4) Customer Cost Center; (5) Destination Address Line 1; (6) Destination Address Line 2; (7) Destination City; (8) Destination State/Province; (9) Destination Postal Code; (10) Destination Country Code; (11) Package ID; (12) USPS Weight; (13) Processing Code Category; and (14) USPS Tracking Number. See the UPS Mail Innovations Guide to Labeling Supplement for more detail, the content of which is expressly incorporated herein by reference.

Figure 9:
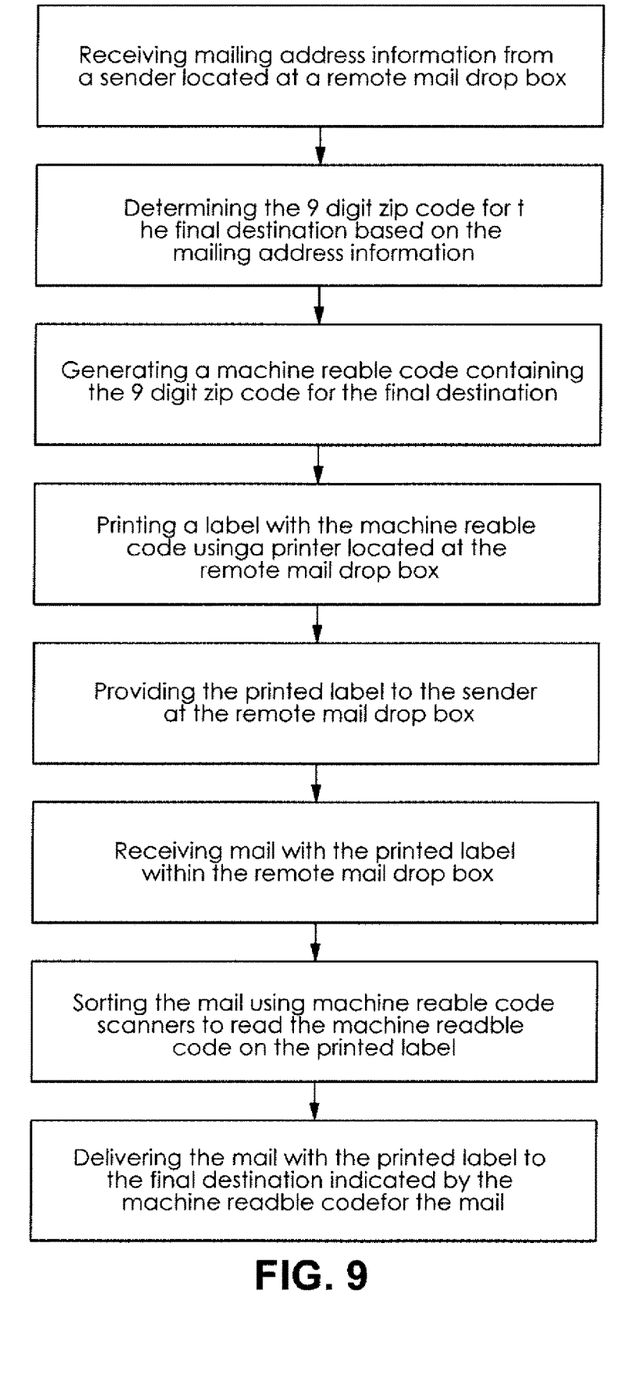
FIG. 9 is schematic view of a web-based method according to the present invention.

As best shown in FIG. 9, in use when a sender 18 wants to send mail via the U.S. Postal Service and the sender arrives at the remote mail drop box 12, 12A with an item of mail to be inserted into the mail drop box 12, the sender 18 is prompted by the touch screen or other user interface device 36 to input address information (such as, for example, street address 46, city 48, and state 50) for the final destination of the mail into the coding device 14 via the touch screen or other user interface device 36. If a full text of the address is to be printed on the label or envelope, the sender is also prompted to input the name 44 of the recipient of the mail. Also, if any other information is required in order to generate the label 40 or the machine-readable code 16, the sender is also prompted to input this information. Once the address information is input by the sender 18 into the coding device 14, the illustrated coding device 14 electronically communicates with the service or ZIP code provider server 20 to obtain the nine digit ZIP code 52 for the recipient address provided by the sender. The ZIP code provider 20 can electronically provide the nine digit ZIP code information to the coding device 14 if the full text of the address is to be printed on the label 40 or envelope 54 and/or the unique machine-readable code 16 for the mail is to be generated by the coding device 14. Once the nine-digit ZIP code 52, and any other necessary information, is determined and provided to the coding device 14, the unique machine-readable code 16 for the mail can be generated by the coding device 14. Alternatively, the ZIP code provider 20 can generate the unique machine-readable code 16 for the mail and electronically send it to the coding device 14. The coding device 14 then prints the printed label 40 and/or printed envelope 54 at the mail drop box 12 and delivers the printed label 40 and/or printed envelope 54 to the sender 18 at the mail drop box 12. As discussed above, the coding device 14 can alternatively be configured to print and provide two of the printed labels 40 or provide the sender the option of receiving one, two, or more of the printed labels 40. The sender 18 can then adhere or otherwise attach the printed label or labels 40 to the mail at the mail drop box 12 and/or insert items to be sent into the printed envelope 54 before inserting the mail into the mail drop box 12. Once the mail is picked up from the mail drop box 12 by a postal service worker or carrier, the mail then proceeds into the postal system 30 for sorting and delivery. Automated machine-readable code scanners 56 of a sorting system 57 can be utilized to read the machine-readable code 16 on the printed label 40 or the printed envelope 54 during sorting and delivery operations so that the mail can be efficiently sorted and then delivered by mail carriers 58 to the mail box 32 of the mail recipient at the final destination.

Any of the features or attributes of the above described embodiments and variations can be used in combination with any of the other features and attributes of the above described embodiments and variations as desired.

It is apparent from the above detailed description of preferred embodiments of the present invention, that the above-disclosed systems and methods designed to encourage increased usage of machine-readable codes on non-bulk mail by the general public for more efficient delivery.

It is also apparent from the above detailed description of preferred embodiments of the present invention, that the above-disclosed systems, methods, and software can be modified to include additional or alternative features. For example, the Zip code server and the connection therewith could be eliminated so that the coding device operates as a stand-alone device at the mail drop box with the ZIP code database incorporated therein. Such an embodiment would eliminate the electronic connection so that it would be less expensive but would also require the coding device to be updated on a regular basis so all information stored therein is up to date. Elimination of the remote communication feature would also eliminate the capability of having remote updating of software, remote security features, remote alarms (such as, for example, label quantity low or zero), and the like.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled

What is claimed is:

1. A method for providing machine-readable destination information on mail comprising the steps of, in combination:
    electronically receiving address information of a final destination for the mail from a sender of the mail located at a mail drop box remote from any in-person or automated postal system selling postal services including postage for delivery of the mail and using a user interface device located at the mail drop box and associated with the mail drop box;
    electronically generating a machine-readable code containing destination information relating to the final destination of the mail in response to receiving the address information from the sender of the mail located at the mail drop box;
    printing at least the machine-readable code on at least one of a label and an envelope using a printer located at the mail drop box;
    providing the at least one of the printed label and the printed envelope to the sender at the mail drop box without receiving a fee for the at least one of the printed label and the printed envelope so that the sender incorporates the at least one of the printed label and the printed envelope with the mail prior to inserting the mail into the mail drop box;
    receiving the mail with the at least one of the printed label and the printed envelope in the mail drop box;
    sorting the mail using a machine readable code scanner to read the machine readable code; and
    delivering the mail to the final destination indicated by the machine readable code.

2. The method for providing machine-readable destination information on mail according to claim 1, further comprising the step of electronically obtaining a nine-digit ZIP code for the final destination for the mail based on the address information received from the sender and wherein the machine-readable code contains destination information relating to the nine-digit ZIP code for the final destination of the mail.

3. The method for providing machine-readable destination information on mail according to claim 2, wherein the machine-readable code contains final destination information for the final destination of the mail.

4. The method for providing machine-readable destination information on mail according to claim 1, wherein the machine-readable code is a barcode.

5. The method for providing machine-readable destination information on mail according to claim 4, wherein the barcode is an Intelligent Mail barcode.

6. The method for providing machine-readable destination information on mail according to claim 1, wherein the printer is a label printer.

7. The method for providing machine-readable destination information on mail according to claim 6, wherein the label is configured so that the sender adheres the printed label to the mail prior to inserting the mail into the mail drop box.

8. A system for providing machine-readable destination information on mail comprising, in combination:
    a mail drop box remote from any in-person or automated postal system selling postage for delivery of the mail;
    a coding device at the mail drop box having a controller including memory and a processor, at least one user interface device operably connected to the controller, and a printer operably connected to the controller to receive electronic instructions from the controller;
    wherein the memory comprises computer-executable instructions executable by the processor to perform the following steps:
        electronically receiving address information of a final destination for the mail from a sender of the mail located at the mail drop box and using the user interface device located at the mail drop box and associated with the mail drop box;
        electronically generating a machine-readable code containing destination information relating to the final destination of the mail in response to receiving the address information from the sender of the mail located at the mail drop box;
        printing at least the machine-readable code on at least one of a label and an envelope using the printer located at the mail drop box; and
        providing the at least one of the printed label and the printed envelope to the sender at the mail drop box without receiving a fee for the at least one of the printed label and the printed envelope so that the sender incorporates the at least one of the printed label and the printed envelope with the mail the mail prior to inserting the mail into the mail drop box.

9. The system for providing machine-readable destination information on mail according to claim 8, further comprising the step of electronically obtaining a nine-digit ZIP code for the final destination for the mail based on the address information received from the sender and wherein the machine-readable code contains destination information relating to the nine- digit ZIP code for the final destination of the mail.

10. The system for providing machine-readable destination information on mail according to claim 9, wherein the machine-readable code contains final destination information for the final destination of the mail.

11. The system for providing machine-readable destination information on mail according to claim 8, wherein the machine-readable code is a barcode.

12. The system for providing machine-readable destination information on mail according to claim 8, wherein the barcode is an Intelligent Mail barcode.

13. The system for providing machine-readable destination information on mail according to claim 8, wherein the printer is a label printer.

14. The system for providing machine-readable destination information on mail according to claim 13, wherein the label is configured so that the sender adheres the printed label to the mail prior to inserting the mail into the mail drop box.

15. The system for providing machine-readable destination information on mail according to claim 8, wherein the coding device is attached to the mail drop box.

16. A method for providing machine-readable destination information on mail comprising the steps of, in combination:
- electronically receiving address information of a final destination for the mail from a sender of the mail located at a mail drop box remote from any in-person or automated postal system selling postage for delivery of the mail and using a user interface device located at the mail drop box and associated with the mail drop box;
- electronically obtaining a nine-digit ZIP code for the final destination for the mail based on the address information received from the sender;
- electronically generating a machine-readable code containing destination information relating to the final destination of the mail;
- wherein the machine-readable code contains destination information relating to the nine- digit ZIP code for the final destination of the mail;
- printing at least the machine-readable code on a label using a label printer located at the mail drop box and attached to the mail drop box;
- providing the printed label to the sender at the mail drop box without receiving a fee for the at least one of the printed label and the printed envelope so that the sender incorporates the at least one of the printed label and the printed envelope with the mail prior to inserting the mail into the mail drop box;
- receiving the mail with the at least one of the printed label and the printed envelope in the mail drop box;
- sorting the mail using a machine readable code scanner to read the machine readable code; and
- delivering the mail to the final destination indicated by the machine readable code.

17. The method for providing machine-readable destination information on mail according to claim 16, wherein the machine-readable code contains final destination information for the final destination of the mail.

18. The method for providing machine-readable destination information on mail according to claim 16, wherein the machine-readable code is a barcode.

19. The method for providing machine-readable destination information on mail according to claim 18, wherein the barcode is an Intelligent Mail barcode.

20. The method for providing machine-readable destination information on mail according to claim 16, wherein the label is configured so that the sender adheres the printed label to the mail prior to inserting the mail into the mail drop box.

* * * * *